(12) United States Patent
Murphy

(10) Patent No.: US 9,180,932 B2
(45) Date of Patent: Nov. 10, 2015

(54) METHOD AND APPARATUS FOR INSTA FILL WAKE SYSTEM

(71) Applicant: Michael Murphy, Canyon Lake, CA (US)

(72) Inventor: Michael Murphy, Canyon Lake, CA (US)

(*) Notice: Subject to any disclaimer, the term of this patent is extended or adjusted under 35 U.S.C. 154(b) by 0 days.

(21) Appl. No.: 14/485,712

(22) Filed: Sep. 13, 2014

(65) Prior Publication Data

US 2014/0373768 A1 Dec. 25, 2014

Related U.S. Application Data

(63) Continuation of application No. 13/690,288, filed on Nov. 30, 2012, now Pat. No. 8,857,356.

(60) Provisional application No. 61/629,976, filed on Dec. 2, 2011.

(51) Int. Cl.
*B63B 1/32* (2006.01)
*B63B 43/06* (2006.01)
*B63B 35/73* (2006.01)
*B63B 39/06* (2006.01)

(52) U.S. Cl.
CPC . *B63B 1/32* (2013.01); *B63B 35/73* (2013.01);
*B63B 43/06* (2013.01); *B63B 39/061* (2013.01);
*B63B 2001/325* (2013.01); *Y02T 70/12* (2013.01); *Y10T 29/4984* (2015.01)

(58) Field of Classification Search
CPC .......... B63B 43/06; B63B 1/32; B63B 39/03; B63B 17/00; B63B 35/73
USPC .................................................. 114/121, 125
See application file for complete search history.

(56) References Cited

U.S. PATENT DOCUMENTS

| | | | |
|---|---|---|---|
| 4,528,927 A | 7/1985 | Iizuka et al. | |
| 5,215,025 A | 6/1993 | Talmor | |
| 5,645,003 A | 7/1997 | Grinde | |
| 6,044,788 A | 4/2000 | Larson et al. | |
| 6,234,099 B1 | 5/2001 | Jessen et al. | |
| 6,427,616 B1 | 8/2002 | Hagen | |
| 6,953,002 B2 | 10/2005 | Jessen et al. | |
| 8,739,723 B1 * | 6/2014 | Murphy | 114/125 |
| 8,857,356 B1 * | 10/2014 | Murphy | 114/125 |

* cited by examiner

*Primary Examiner* — Lars A Olson
(74) *Attorney, Agent, or Firm* — Heimlich Law, PC; Alan Heimlich, Esq.

(57) ABSTRACT

A Method and Apparatus for Insta Fill Wake System have been disclosed. By using a rotatable cylinder that can be positioned as closed, flood, and drain and deployable on a boat, controlled filling/emptying/holding of water in ballast tanks is possible without the use of pumps.

20 Claims, 18 Drawing Sheets

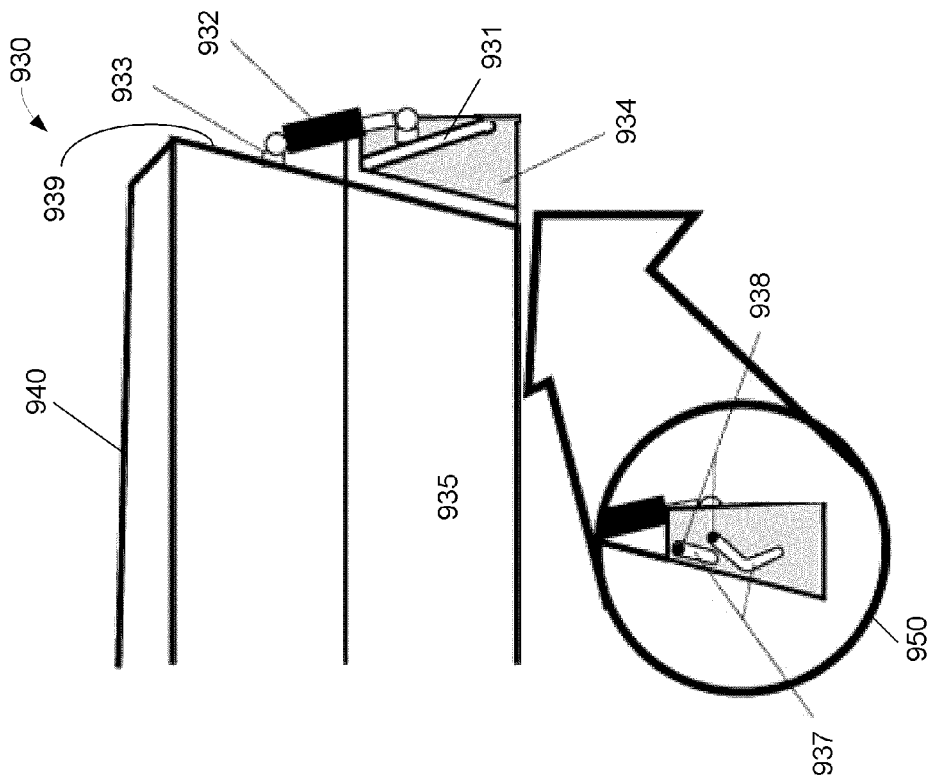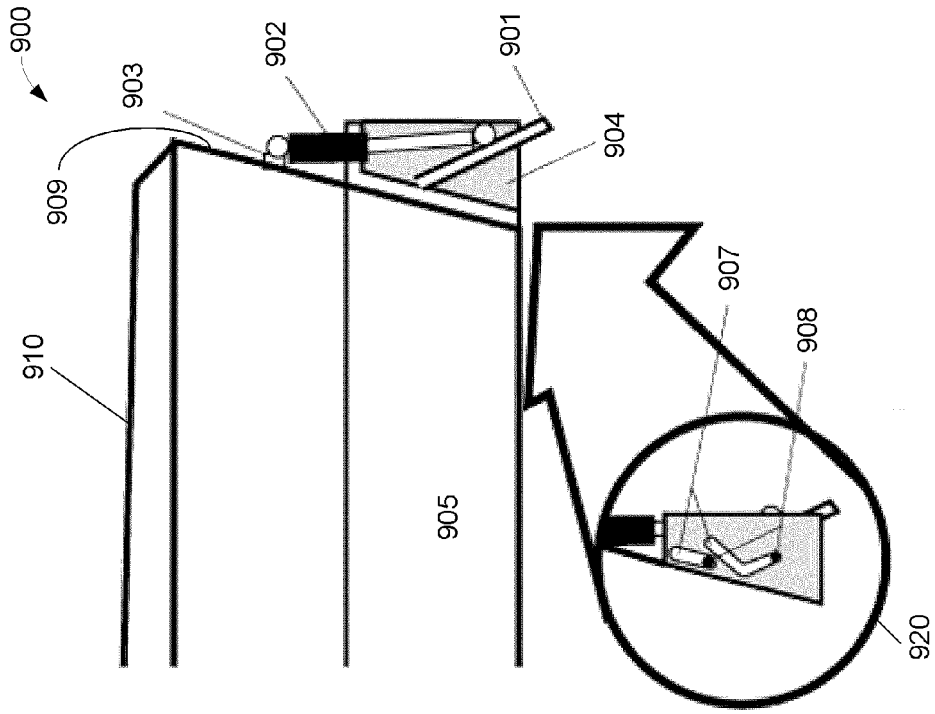

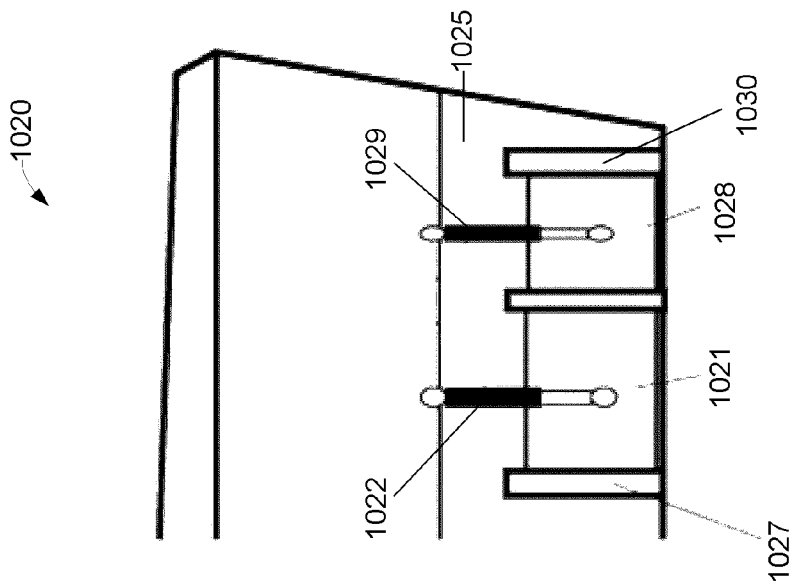
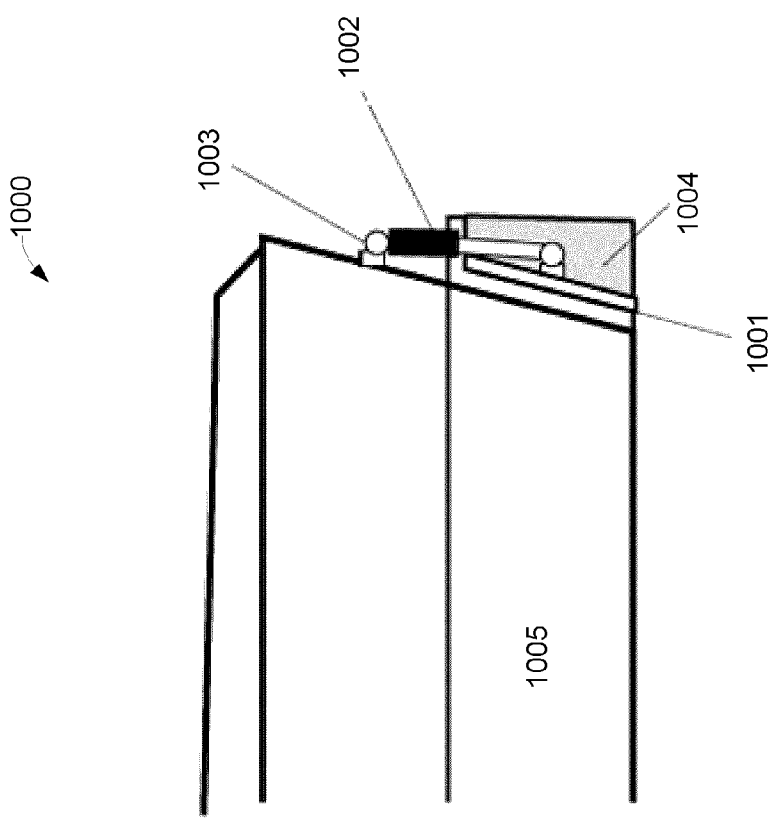
FIG. 10B
FIG. 10A
FIG. 10

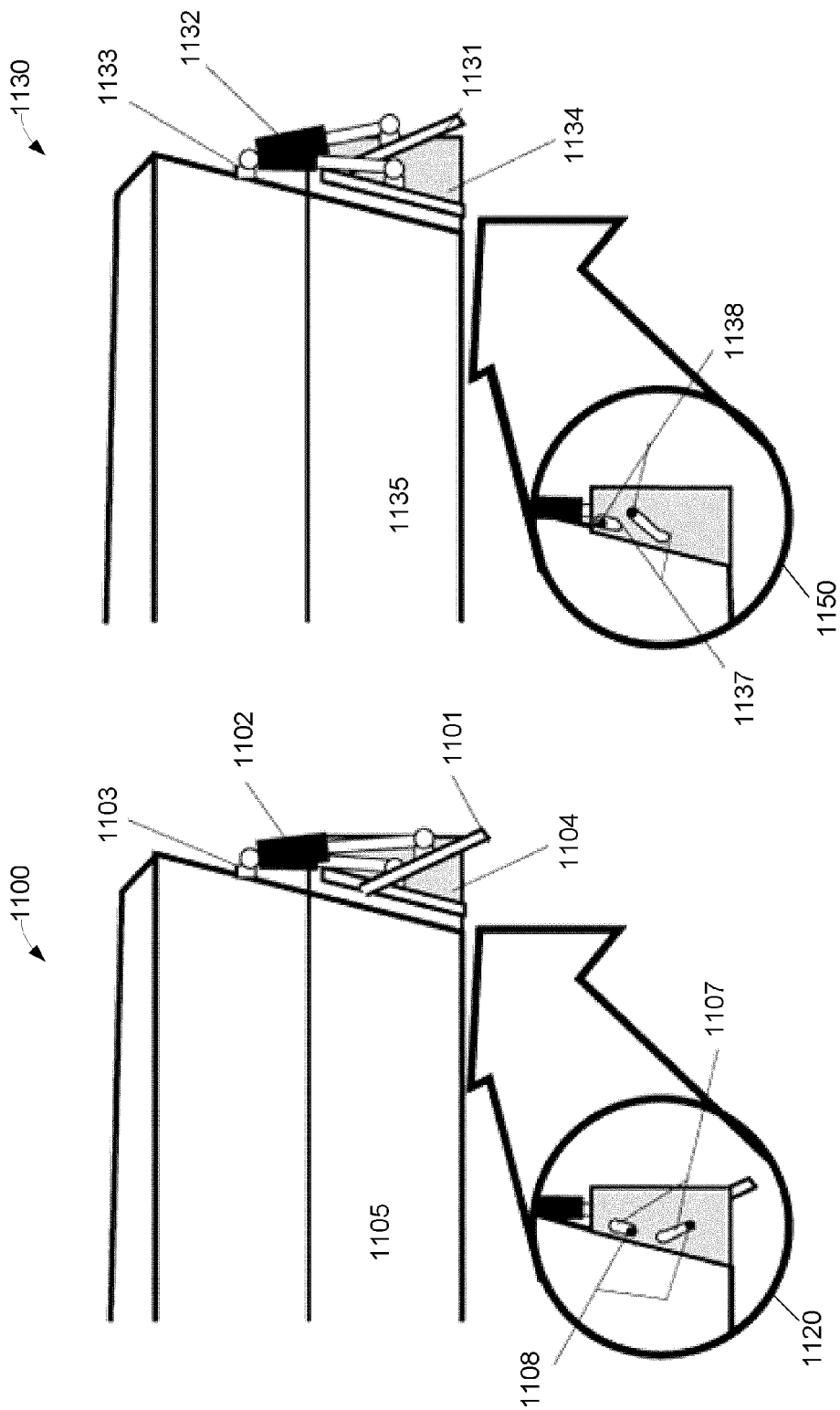

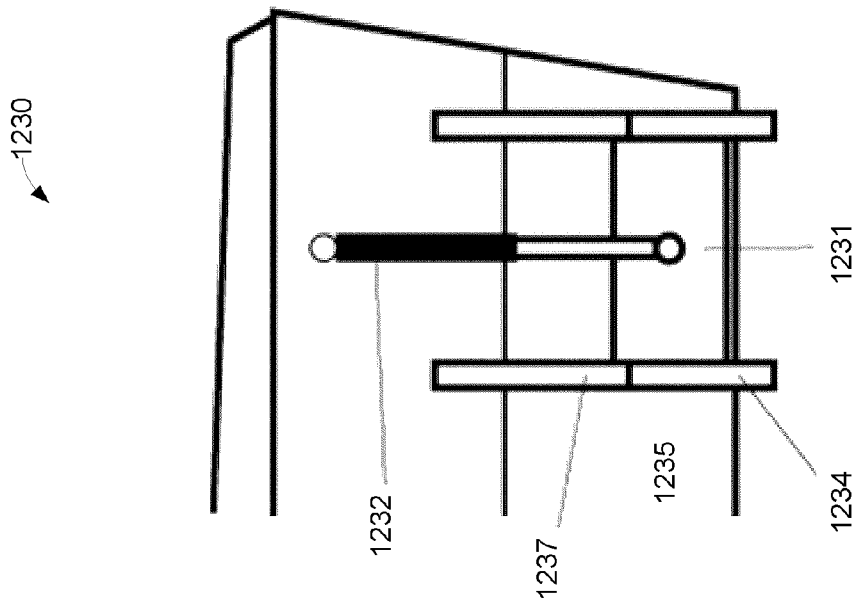
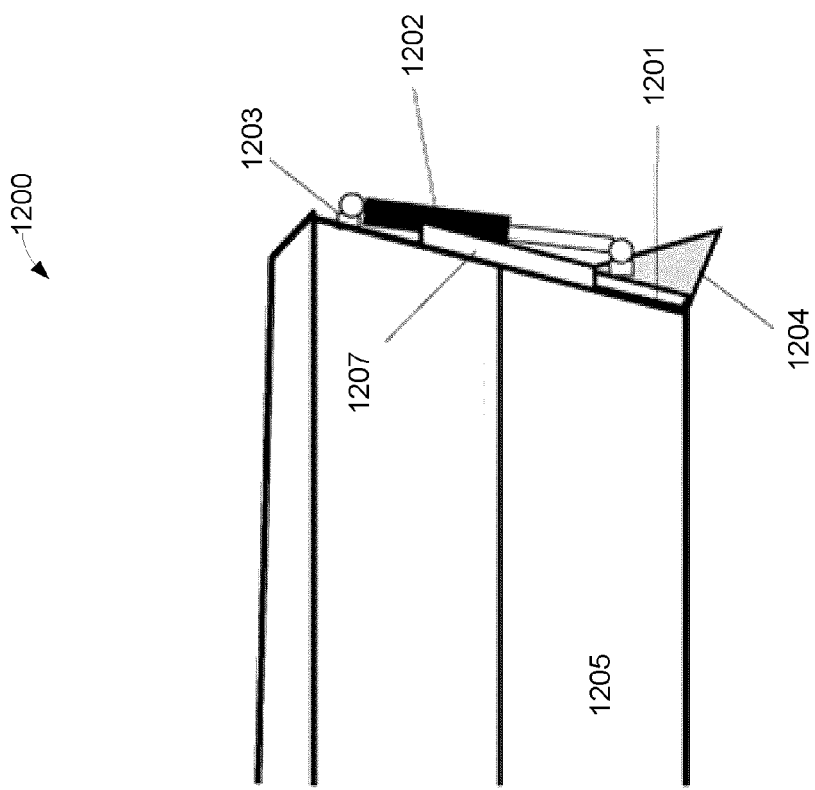
FIG. 12B
FIG. 12A
FIG. 12

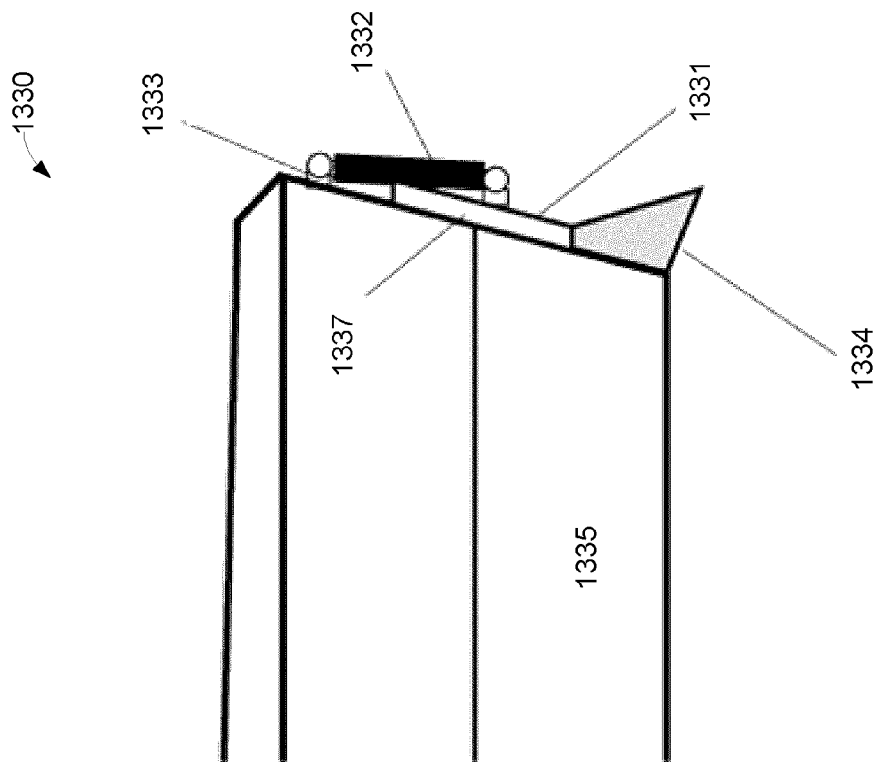
FIG. 13B
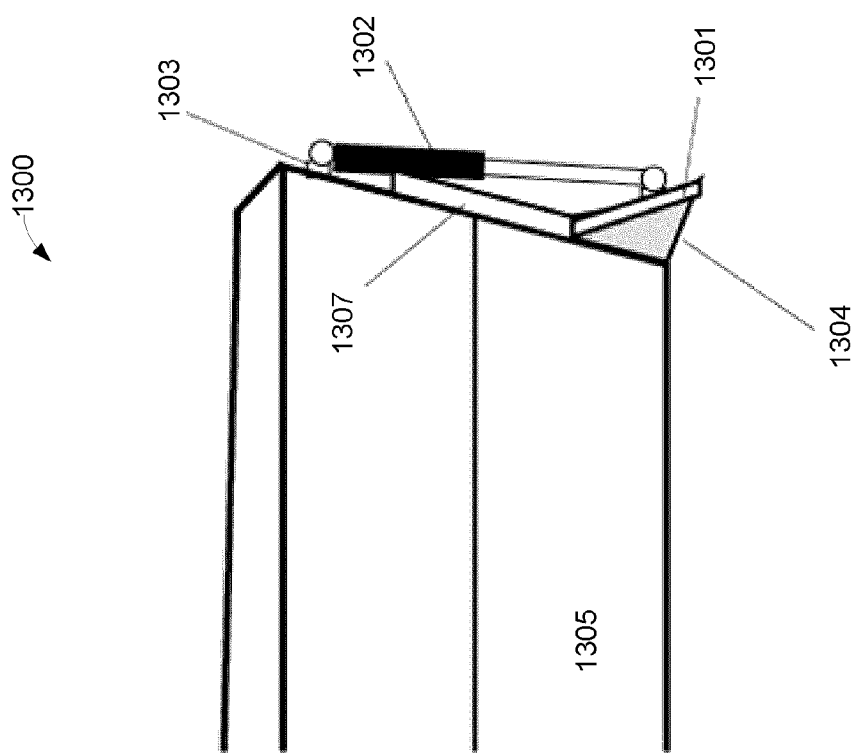
FIG. 13A
FIG. 13

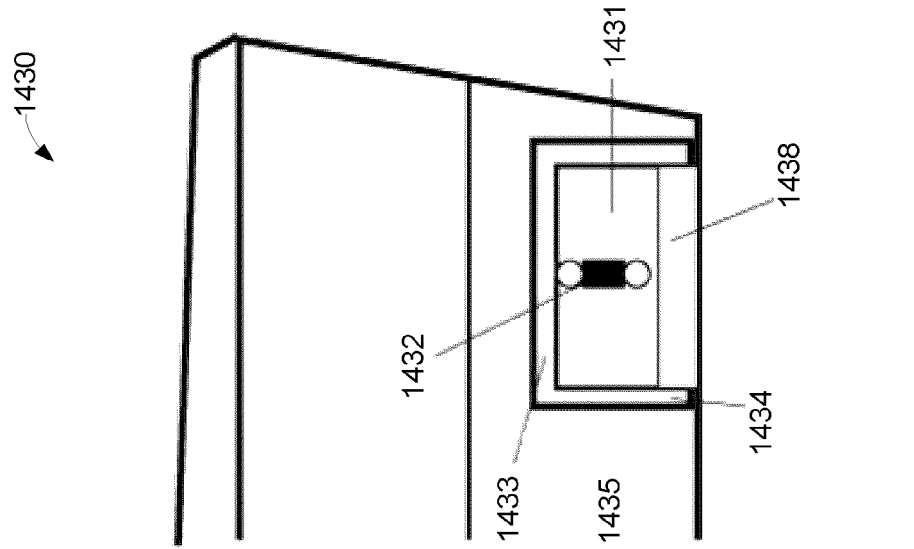
FIG. 14B
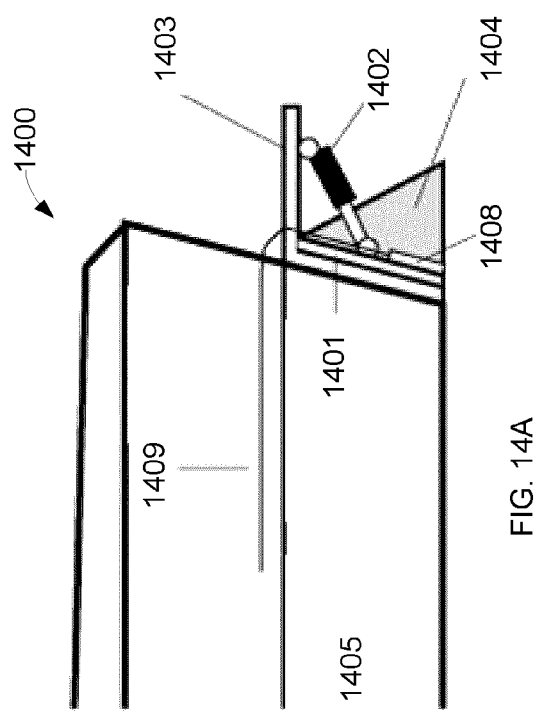
FIG. 14A
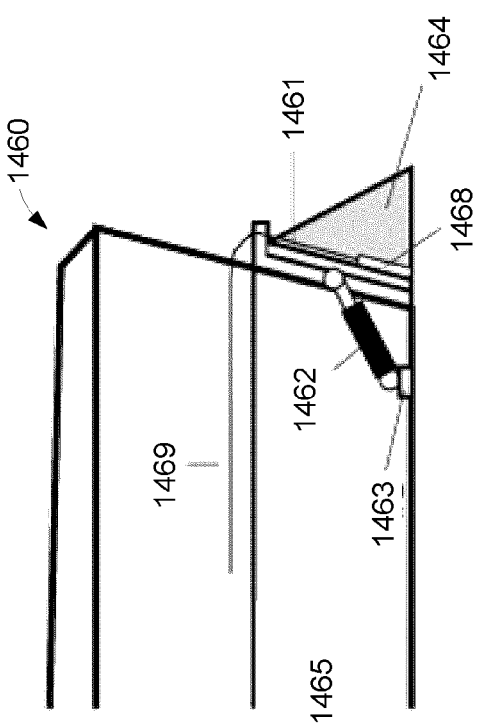
FIG. 14C
FIG. 14

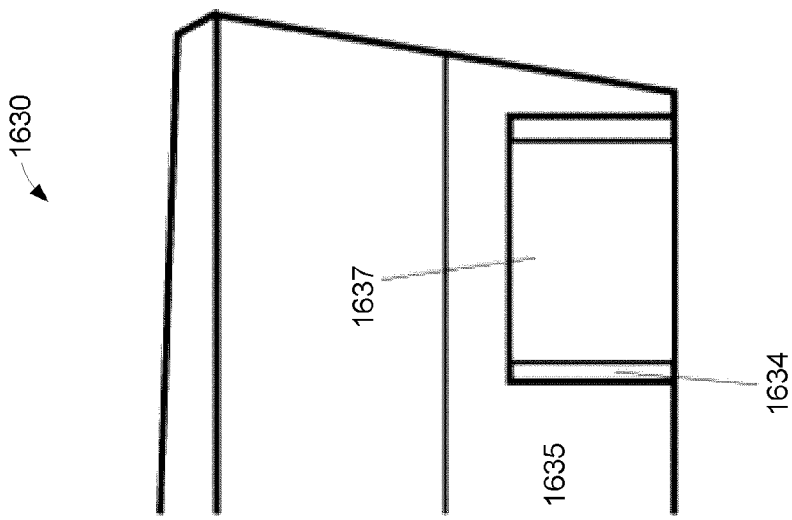
FIG. 16B
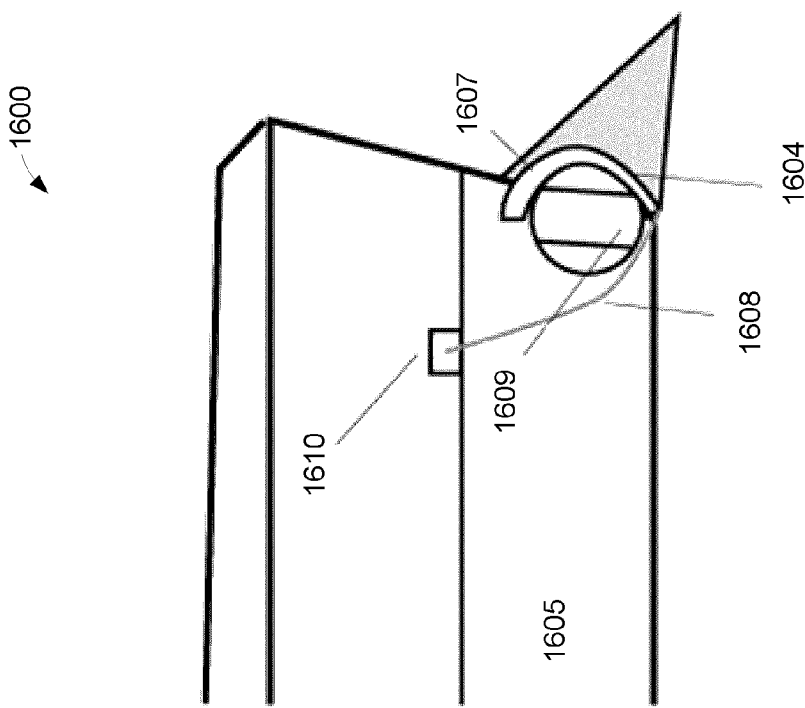
FIG. 16A
FIG. 16

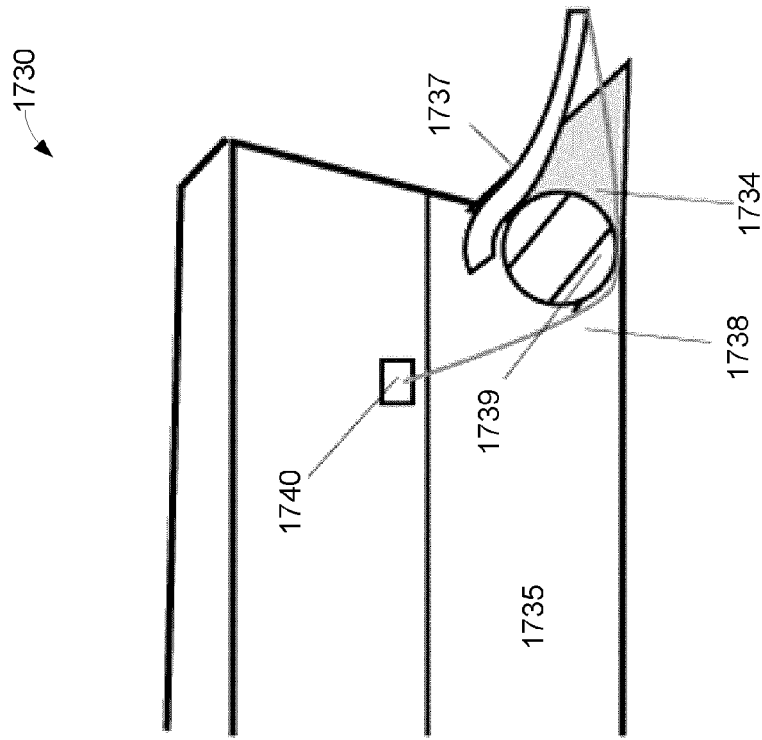
FIG. 17B
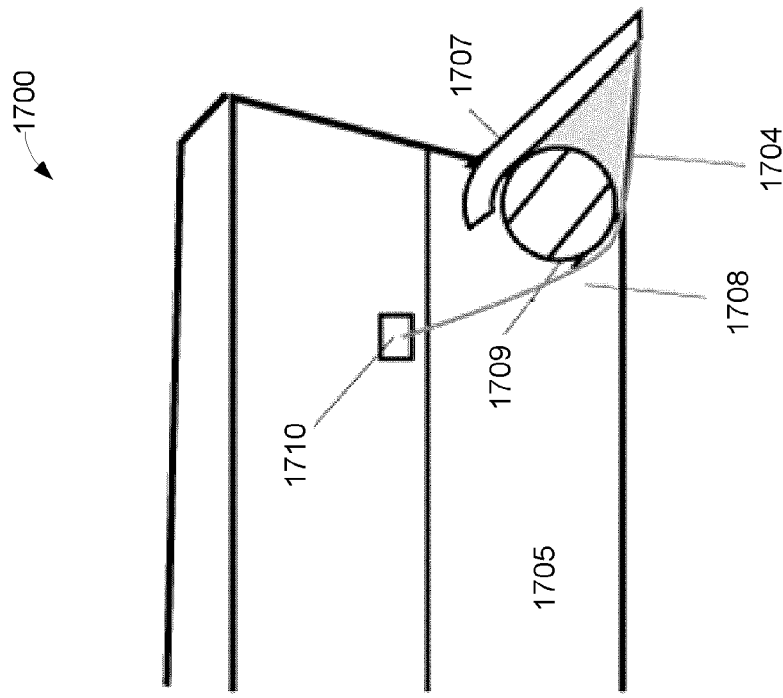
FIG. 17A
FIG. 17

FIG. 18

METHOD AND APPARATUS FOR INSTA FILL WAKE SYSTEM

RELATED APPLICATION

The present Application for Patent is related to U.S. Patent Application No. 61/629,976 entitled "Insta Fill Wake System" filed Dec. 2, 2012, and is hereby incorporated herein by reference. The present Application for Patent is related to, and claims priority to, U.S. patent application Ser. No. 13/690, 288 titled "Method and Apparatus for Insta Fill Wake System" filed Nov. 30, 2012, pending, and is hereby incorporated herein by reference.

FIELD OF THE INVENTION

The present invention pertains to water sports. More particularly, the present invention relates to a Method and Apparatus for Insta Fill Wake System.

BACKGROUND OF THE INVENTION

In several water sports, for example, but not limited to, wakeboarding, waterskiing, etc., "getting air" is desirable. One way of "getting air" is to launch oneself off a wave in the water into the air. This wave can be created by a boat, for example, towing person(s) engaging in the water sport. This wave created by the boat is often referred to as a wake. To create a wake a boat must displace water as it moves forward. One approach to displace as much water as possible is to lower a boat in the water. This lowering can be achieved by placing ballast tank(s) in the boat. However filling and emptying the ballast tanks(s) is slow and can involve pumps, valves, plumbing, etc. Additionally valves and plumbing may leak resulting in a boat sinking. This presents a technical problem for which a technical solution using a technical means is needed.

BRIEF DESCRIPTION OF THE DRAWINGS

The invention is illustrated by way of example and not limitation in the figures of the accompanying drawings in which:

FIG. 9 consists of FIG. 9A and FIG. 9B. FIG. 9A illustrates one embodiment of the invention showing a side view of a boat where a three position pivoting track mechanism expanded external view is shown in a flood position for filling a ballast tank. FIG. 9B illustrates one embodiment of the invention showing a side view of a boat where a three position pivoting track mechanism expanded external view is shown in a drain position for draining a ballast tank.

FIG. 10 consists of FIG. 10A and FIG. 10B. FIG. 10A illustrates one embodiment of the invention showing a side view of a double gate in the closed position. FIG. 10B illustrates one embodiment of the invention showing a rear view of a ballast tank with double gate in the closed position.

FIG. 11 consists of FIG. 11A and FIG. 11B. FIG. 11A illustrates one embodiment of the invention showing a side view of a double gate with the intake gate open and the drain gate closed. FIG. 11B illustrates, one embodiment of the invention showing a side view of a double gate with the intake gate closed and the drain gate open.

FIG. 12 consists of FIG. 12A and FIG. 12B. FIG. 12A illustrates one embodiment of the invention showing a side view of a three position sliding track with the gate closed. FIG. 12B illustrates one embodiment of the invention showing a rear view of a three position sliding track with the gate closed.

FIG. 13 consists of FIG. 13A and FIG. 13B. FIG. 13A illustrates one embodiment of the invention showing a side view of a three position sliding track with the gate in the flood position. FIG. 13B illustrates one embodiment of the invention showing a side view of a three position sliding track with the gate in the drain position.

FIG. 14 consists of FIG. 14A, FIG. 14B, and FIG. 14C. FIG. 14A illustrates one embodiment of the invention showing a side view of a deployable scupper in a closed position with an external actuator. FIG. 14B illustrates one embodiment of the invention showing a rear view of a deployable scupper in a closed position with an external actuator. FIG. 14C illustrates one embodiment of the invention showing a side view of a deployable scupper in a closed position with an internal actuator.

FIG. 16 consists of FIG. 16A, and FIG. 16B. FIG. 16A illustrates one embodiment of the invention showing a side view of a rotating cylinder in a closed position. FIG. 16B illustrates one embodiment of the invention showing a rear view of a rotating cylinder in a closed position.

FIG. 17 consists of FIG. 17A, and FIG. 17B. FIG. 17A illustrates one embodiment of the invention showing a side view of a rotating cylinder in a flood position. FIG. 17B illustrates one embodiment of the invention showing a side view of a rotating cylinder in a drain position.

FIG. 18 shows various embodiments of the invention.

DETAILED DESCRIPTION

Figure 1:
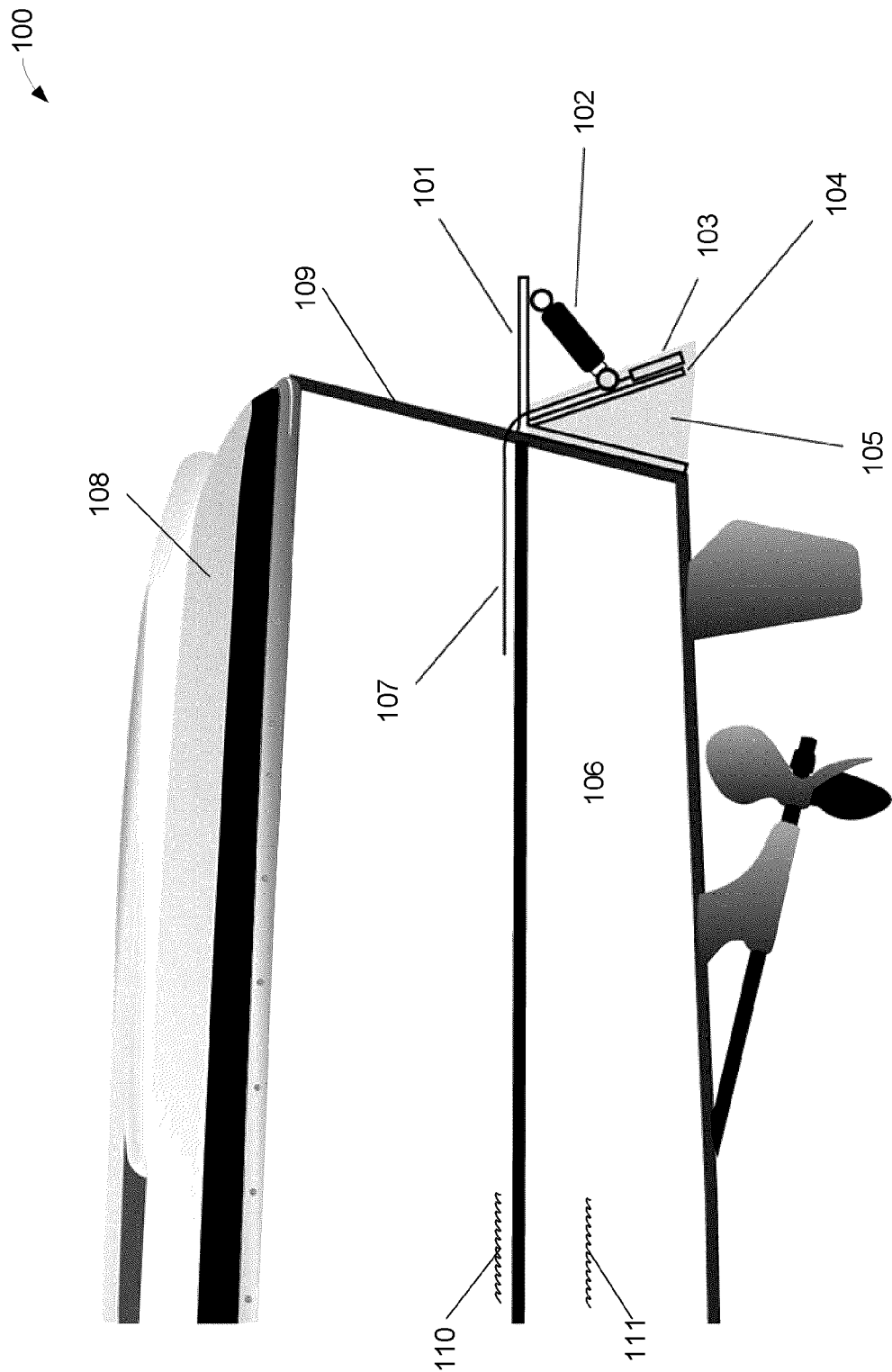
FIG. 1 illustrates one embodiment of the invention showing a side view filling stationary position with scupper retracted.

In one embodiment of the invention, the system without using pumps can fill ballast tank(s).

In one embodiment of the invention, the system without using pumps can drain ballast tank(s).

In one embodiment of the invention, the system uses a single gate.

In one embodiment of the invention, the system uses a same single gate for filling/emptying ballast tank(s).

In one embodiment of the invention, the system uses a single gate per ballast tank for both filling and emptying.

In one embodiment of the invention, the system uses a single gate per ballast tank for both filling and emptying while a boat is in motion.

In one embodiment of the invention, the system uses a single gate per ballast tank without any pumps or scupper for both filling and emptying while a boat is in motion.

In one embodiment of the invention, the system uses a single gate with a scupper per ballast tank without any pumps for both filling and emptying while a boat is in motion.

In one embodiment of the invention, the system does not use pumps to fill some ballast tank(s).

In one embodiment of the invention, the system uses only a gate for controlling filling/emptying of some of the ballast tank(s).

In one embodiment of the invention, the system operates with no valves to control filling/emptying of some of the ballast tank(s).

In one embodiment of the invention, the system uses water pressure on a gate to fill ballast tank(s).

In one embodiment of the invention, the system works using water pressure developed while the boat is in forward motion to fill/empty ballast tank(s).

In one embodiment of the invention, an air venting system for ballast tank(s) are used.

In one embodiment of the invention, the system without using anything further solely uses the boat's forward motion to empty ballast tank(s).

In one embodiment of the invention, the system using a gate and the boat's forward motion can empty ballast tank(s).

In one embodiment of the invention, the system uses gate(s) mounted on the transom of a boat.

In one embodiment of the invention, the system uses gate(s) mounted on the ballast tank(s) of a boat.

In one embodiment of the invention, the system uses U-shaped ballast tank(s) and one or more gates on the ends of the U-shaped ballast tank(s).

In one embodiment of the invention, the system uses gate(s) mounted on the ballast tank(s) of a boat located between bow and stern.

In one embodiment of the invention, the system uses air vent(s) on the ballast tank(s) to control filling/emptying rate.

In one embodiment of the invention, the system uses air vent(s) on the ballast tank(s) and located above the ballast tank and between the front and rear of the ballast tank(s).

In one embodiment of the invention, the system uses deployable water pick-ups that are mounted on a gate.

In one embodiment of the invention, the system uses deployable water pick-ups that are mounted on a gate and the water pick-ups may be raised to eliminate drag on the boat as it is moving.

In one embodiment of the invention, the system uses deployable water pick-ups that are mounted on a gate, and the gate is mounted on a boat transom.

In one embodiment of the invention, the system uses deployable water pick-ups that are deployed on a gate.

In one embodiment of the invention, the system uses deployable water pick-ups that are deployed past the boat transom on a gate.

In one embodiment of the invention, using the gate force feed water allows the ballast tank(s) to be taller than the waterline and thus being able to fill ballast tank(s) above the waterline thereby adding more water which increases the weight on the boat which results in a bigger wake.

In one embodiment of the invention, using the gate force feed water creates pressure without the use of pumps, diversion valves, check valves, etc.

In one embodiment of the invention, the ballast tank(s) run all the way to the transom of the boat.

In one embodiment of the invention, the gate can hinge up and down from the transom of the boat.

In one embodiment of the invention, a sliding gate flush mounts to the inboard or outboard side of the transom. The gate can slide vertical up and down.

In one embodiment of the invention, the system integrates both the intake and the outlet, reducing both filling and emptying times and reducing moving parts by running the ballast tanks through the transom of the boat and using a gate.

In one embodiment of the invention, opening the gate will expose approximately 90% of the rear end of the ballast tank. This will instantly flood the ballast tank assuming the air vents allow for adequate air venting.

In one embodiment of the invention, ballast tank(s) running all the way to the transom of the boat where an opening is located for water entry/exit prevents a leaking seal on the transom from flooding the boat because only the ballast tank(s) with a leaking seal will fill with water, not the boat.

In one embodiment of the invention a gate can hinge up and down from the transom of the boat. In one embodiment a sliding gate that flush mounts to the inboard or outboard side of the transom can be used that can slide vertically up and down.

In one embodiment of the invention both the intake and outlet are integrated into a single multi-positionable gate such that both filling and emptying times are reduced, and moving parts are reduced compared to using pumps, valves, etc.

In one embodiment of the invention both the intake and outlet are integrated into a single opening, reducing both filling and emptying times and reducing parts by running the ballast tanks through the transom of the boat and using a gate.

In one embodiment of the invention opening the gate will expose approximately 90% of the rear end of the ballast tank. This will instantly flood the ballast tank as long as the air vents allow for adequate air venting.

In one embodiment of the invention, since filling/emptying can be done when the boat is on plane, less horsepower is needed and less fuel is consumed compared to starting a boat from standstill with full ballast tank(s).

In one embodiment of the invention, the system will allow the tanks to empty while picking up a fallen or downed rider. The process used to pick up a downed rider with full ballast tanks is:
1. When the skier falls, open the water gate (FIG. 1 at 104). This lets the ballast tank (FIG. 1 at 106) water out of the tanks.
2. Close the water gate (FIG. 3 at 305) so the boat does not refill when the boat stops.
3. Pick up rider.
4. Deploy the scupper (from position FIG. 1 at 103 to position FIG. 2 at 203).
5. As the boat starts, open the water gate (FIG. 2 at 204) to fill the ballast tanks. The tanks will fill in approximately 5 seconds.
6. When the tanks are full, retract the scupper (FIG. 1 at 103) and close the water gate (FIG. 3 at 305).

In one embodiment of the invention this approach eliminates the need for massive horse power in boats or the need for a transmission to plane the boat with large amounts of water in it saving a considerable amount of money in fuel, big engines and transmissions to carry water.

In one embodiment of the invention, the air vent (for example, FIG. 4 at 408) may be throttled to control the intake and release of water from the ballast tanks.

In one embodiment of the invention The water intake gate (for example, in FIG. 5 at 504) may be operated by a variety of different methods, for example, but not limited to hydraulic, pneumatic, electrical, mechanically, etc.

In one embodiment of the invention, this system uses a stationary water pick up (water dam) (for example, FIG. 1 at 105) combined with a deployable water scupper (for example, FIG. 1 at 103) used in combination this will turn the water gate (for example, FIG. 1 at 104) into a water scoop which will make it possible to fill and empty tanks through the same hole.

In the USA right now there is a huge problem of transporting mussels from lake to lake. Most lakes in the western US require an inspection of the boat to eliminate the migration of mussels between lakes. The old systems have no way to inspect for mussels in the enclosed tank. In one embodiment of the invention, this new system would allow for inspection by opening up the rear end of the tank (e.g. opening the gate).

In one embodiment of the invention a gate (for example, FIG. 1 at 104) is used combined with a deployable water scupper (for example, FIG. 1 at 103) and water dam(s) (for example, FIG. 1 at 105) to make it possible to fill and empty tanks through the same hole.

FIG. 1 illustrates, generally at 100, one embodiment of the invention showing a side view filling stationary position with scupper retracted. 101 is a support housing bracket. 102 is a gate deployment cylinder. 103 is a deployable scupper (shown here in the up position). 104 is a water intake gate (shown here in the open position). 105 is a stationary water dam (port). 106 is a ballast tank. 107 is a scupper deployment cable. 108 is a boat. At 109 is a transom of boat 108. At 110 is a waterline indication for a full ballast tank 106. At 111 is a waterline indication for an empty ballast tank 106.

As shown in FIG. 1, the ballast tank 106 extends all the way to the transom 109. In this embodiment if there is a leak in the water intake gate 104 to transom seal when the water intake gate is closed the boat 108 will not be flooded. That is without forming a seal between the water intake gate 104 and the transom 109 the boat 108 will not flood. The worst that happens is the ballast tank 106 slowly fills or empties.

As shown in FIG. 1, the ballast tank 106 extends all the way to the transom and the water intake gate in the open position allows for easy visual inspection of the ballast tank 106. In this way foreign matter (e.g. marine life, etc.) may be inspected for in the ballast tank 106. That is a human may place their eyes between the stationary water dam 105 (only one shown—one on each side of water intake gate 104) and the water intake gate 104 peering into the ballast tank 106.

In one embodiment of the invention, for example, as partially illustrated in FIG. 1, the deployable scupper 103 and the scupper deployment cable 107 are not needed. That is a gate, for example, as illustrated at FIG. 1 at water intake gate 104, without a scupper, for example, as illustrated at FIG. 1 at deployable scupper 103, may be used to fill and empty a ballast tank, for example, as illustrated at FIG. 1 at ballast tank 106.

In one embodiment of the invention, for example, as illustrated in FIG. 1 at gate deployment cylinder 102 the gate deployment cylinder may be any mechanical means to operate the gate. For example, gate deployment cylinder may be, but is not limited to, a cable assembly, a gear assembly, a pneumatic assembly, a hydraulic assembly, a ball screw assembly, etc. Additionally, the position of the gate deployment cylinder, for example, as shown in FIG. 1 at gate deployment cylinder 102, may be outboard the boat 108 as shown or inside the boat 108. Additionally, the gate deployment cylinder 102 may be powered by a variety of means, for example, but not limited to, user cranked, electric, compressed fluid, compressed gas, mechanically linked to a boat 108 motor, etc.

While the ballast tank 106 is shown going to the transom 109 in FIG. 1, the invention is not so limited, and the ballast end may be placed forward of the transom with the gate also moved forward of the transom. In one embodiment of the invention, the gate is located on the rear of the ballast tank.

In one embodiment of the invention, without a deployable scupper, the gate may be used to fill and drain through the same hole in a ballast tank while the boat is moving through the water.

In one embodiment of the invention, without a deployable scupper, the gate may be used to fill a ballast tank while the boat is not moving through the water.

In one embodiment of the invention, without a deployable scupper, the gate may opened for example at a 10 degree angle to being fully closed to fill a ballast tank while the boat is moving through the water. In one embodiment of the invention the gate may be opened between 2 degrees and 90 degrees relative to being fully closed to fill a ballast tank while the boat is moving. In one embodiment of the invention the gate may be opened between 11 degrees and 135 degrees relative to being fully closed to empty a ballast tank while the boat is moving.

In one embodiment of the invention, without a deployable scupper, the gate may be opened 10 degrees with respect to a normal to the waterline for rapid filling.

Figure 2:
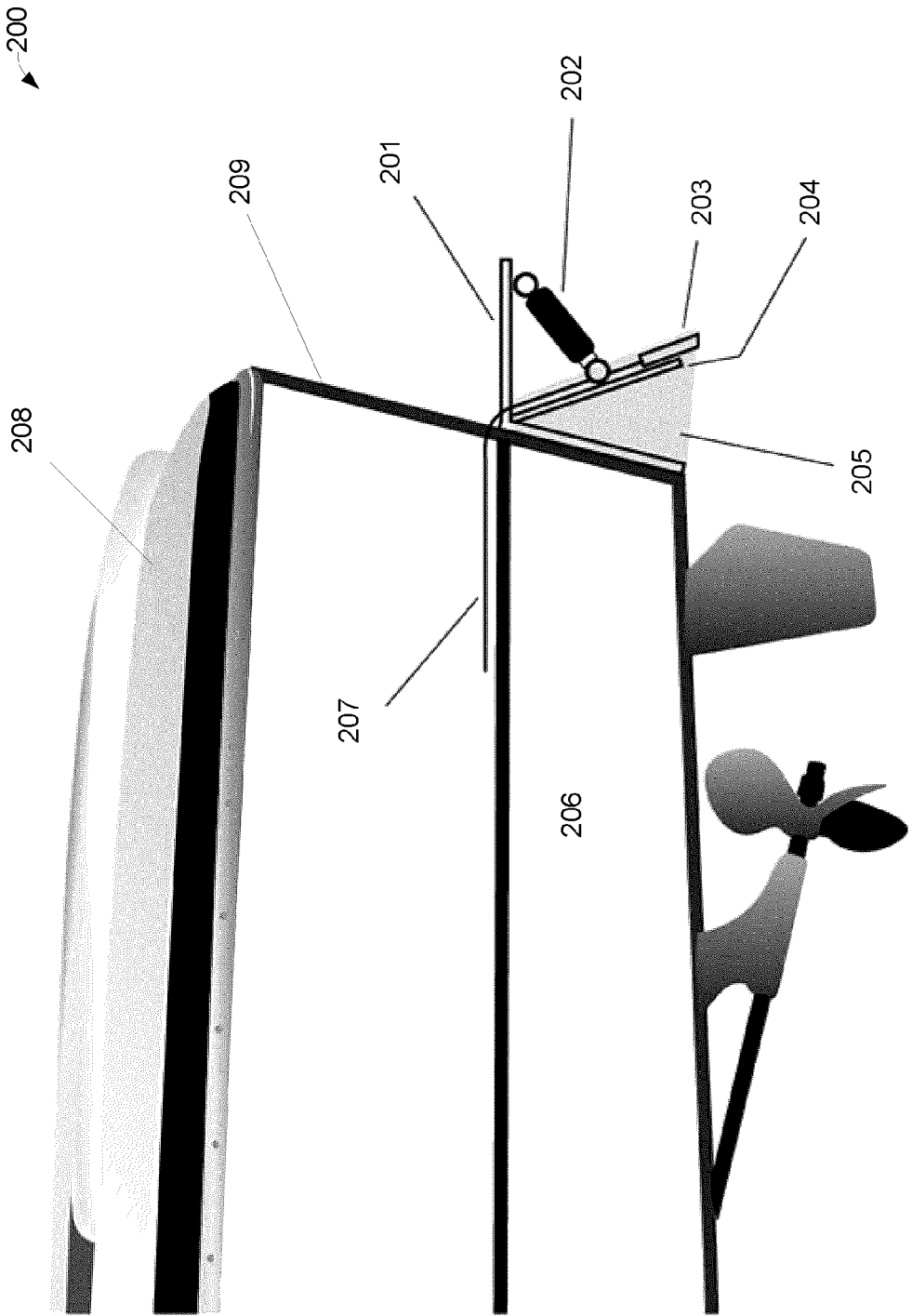
FIG. 2 illustrates one embodiment of the invention showing a side view filling running position with scupper deployed.
Figure 3:
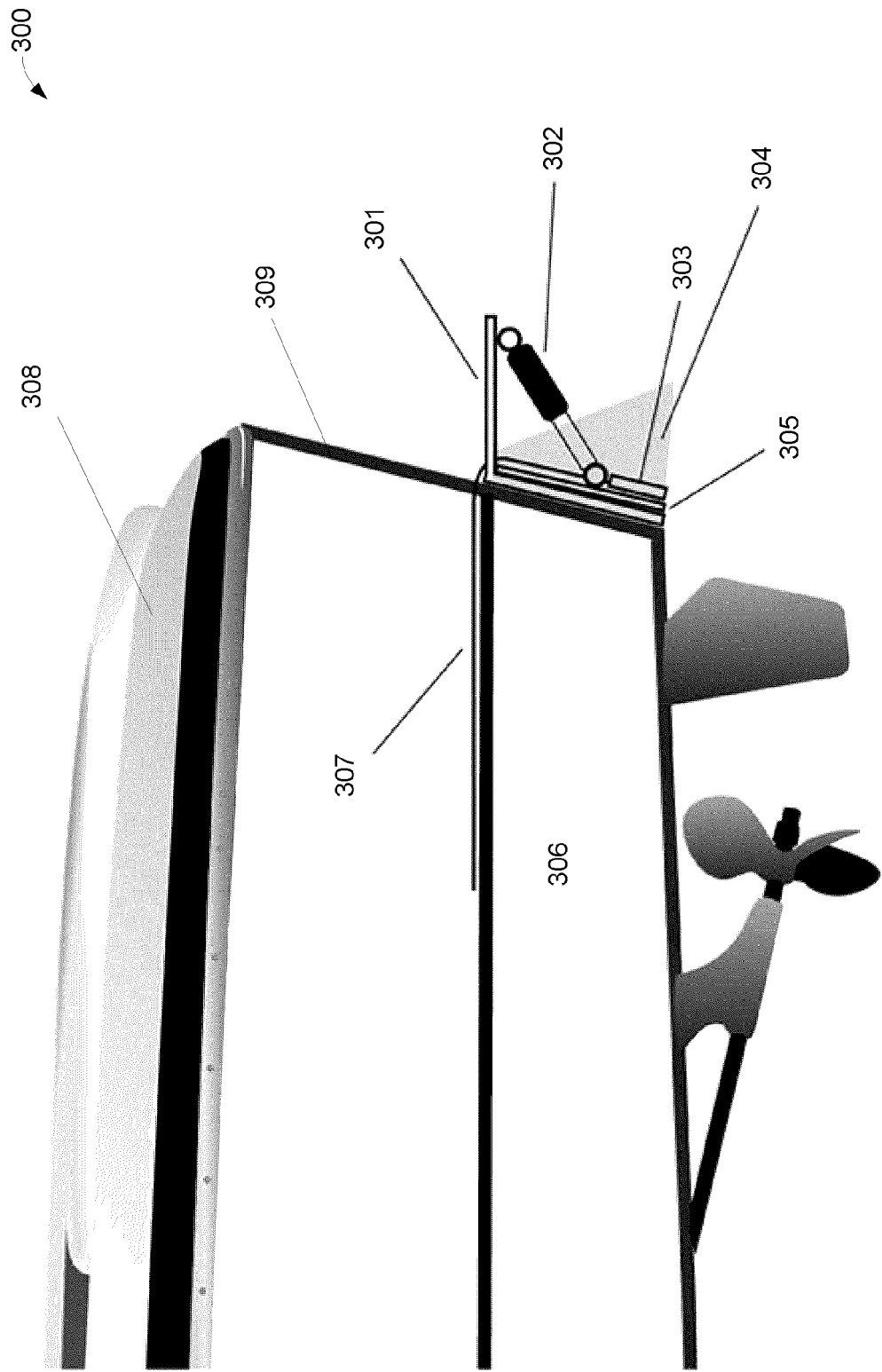
FIG. 3 illustrates one embodiment of the invention showing a side view water intake gate closed.

FIG. 2 illustrates, generally at 200, one embodiment of the invention showing a side view filling running position with scupper deployed. 201 is a support housing bracket. 202 is a gate deployment cylinder. 203 is a deployable scupper (shown here in the down position). 204 is a water intake gate (shown here in the open position). 205 is a stationary water dam (port). 206 is a ballast tank. 207 is a scupper deployment cable. 208 is a boat. At 209 is a transom of boat 208.

FIG. 3 illustrates, generally at 300, one embodiment of the invention showing a side view water intake gate closed. 301 is a support housing bracket. 302 is a gate deployment cylinder. 303 is a deployable scupper (shown here in the up position). 304 is a stationary water dam (port). 305 is a water intake gate (shown here in the closed position). 306 is a ballast tank. 307 is a scupper deployment cable. 308 is a boat. At 309 is a transom of boat 308.

Figure 4:
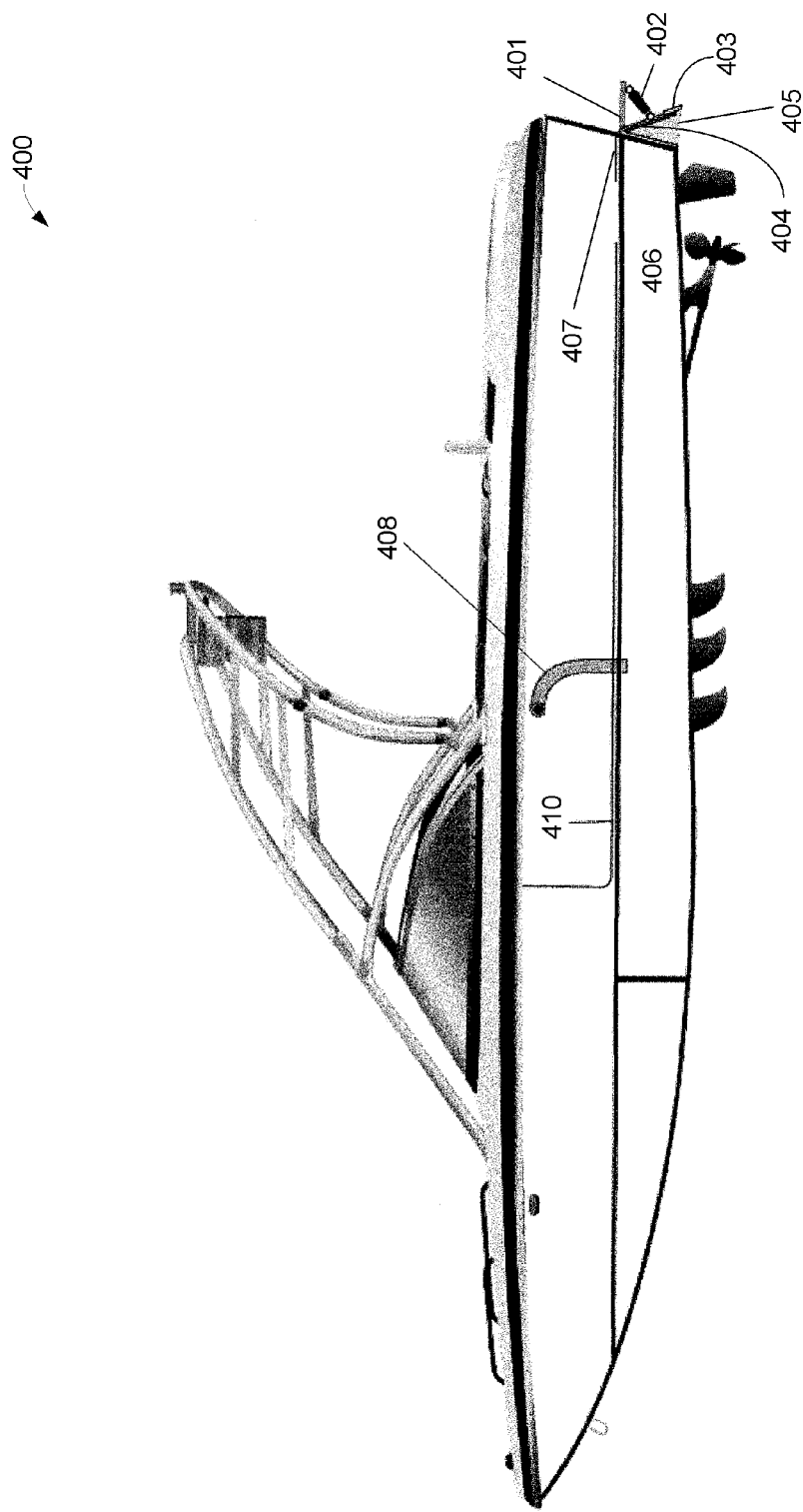
FIG. 4 illustrates one embodiment of the invention showing a side view.

FIG. 4 illustrates, generally at 400, one embodiment of the invention showing a side view. 401 is a support housing bracket. 402 is a gate deployment cylinder. 403 is a deployable scupper (shown here in the down position). 404 is a water intake gate (shown here in the open position). 405 is a stationary water dam (port). 406 is a ballast tank. 407 is a scupper deployment cable. 408 is an air vent. 410 is a floor board.

In one embodiment of the invention, for example, as illustrated in FIG. 4, there are a plurality of air vents, like that illustrated in FIG. 4 at 408, and the vents may be located forward on the ballast tank(s). In one embodiment of the invention air vent opening(s) may be rectangular in shape.

In one embodiment of the invention, the system uses valves (not shown in FIG. 4) on the air vent(s), for example, as illustrated in FIG. 4 at 408 to control the amount of air that enters/exits the air vent thereby controlling the filling/emptying rate of the ballast tank(s).

Figure 5:
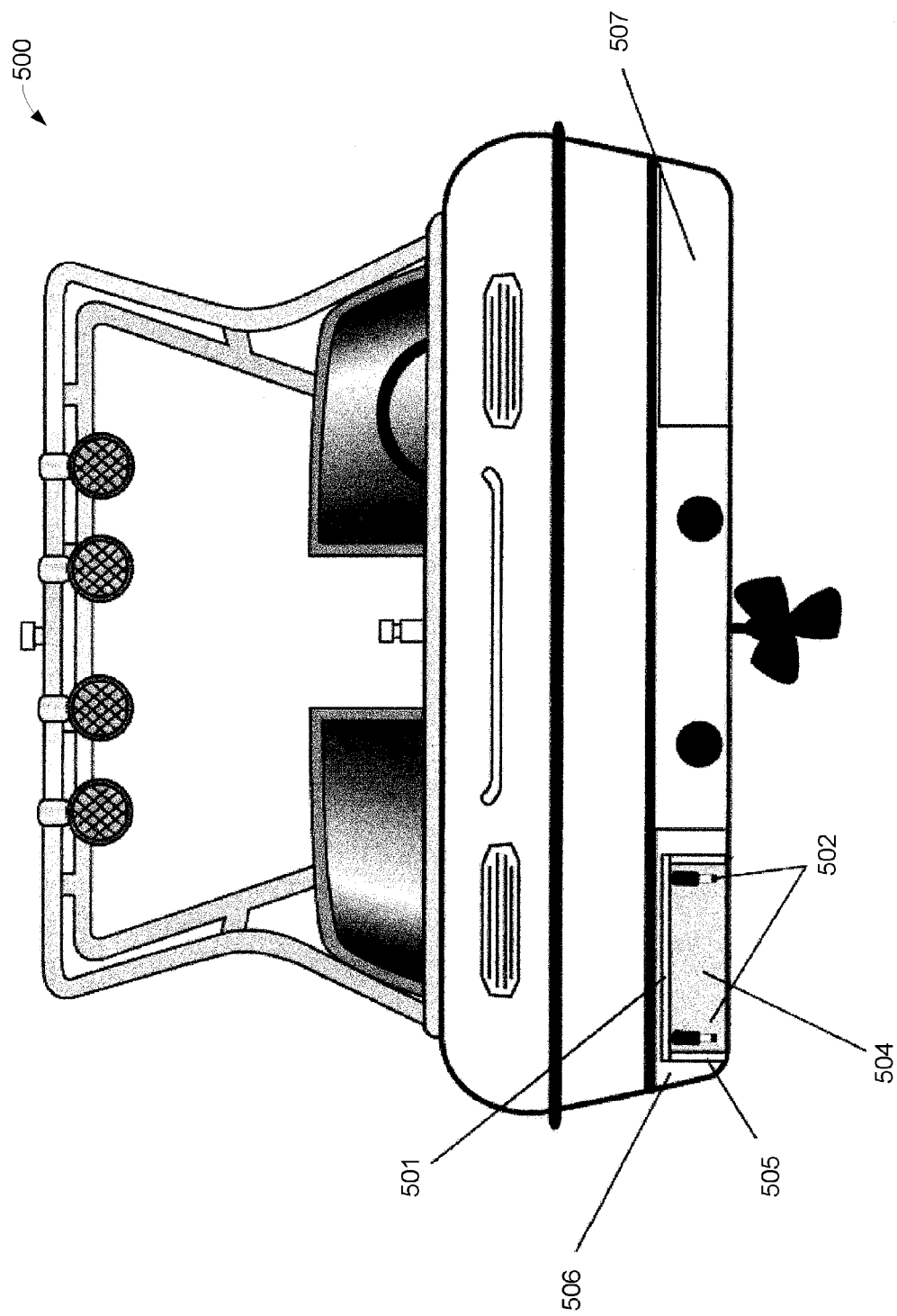
FIG. 5 illustrates one embodiment of the invention showing a rear view.

FIG. 5 illustrates, generally at 500, one embodiment of the invention showing a rear view. Note that a gate is not depicted on the starboard side. 501 is a support housing bracket (port). 502 shows two gate deployment cylinders (port). 504 is a water intake gate (shown here in the closed position). 505 is a stationary water dam (port). 506 is a ballast tank (port). 507 is a ballast tank (starboard).

While FIG. 5 illustrates two gate deployment cylinders, the invention is not so limited and one gate deployment cylinder may be used, or more than two may be used.

Figure 6:
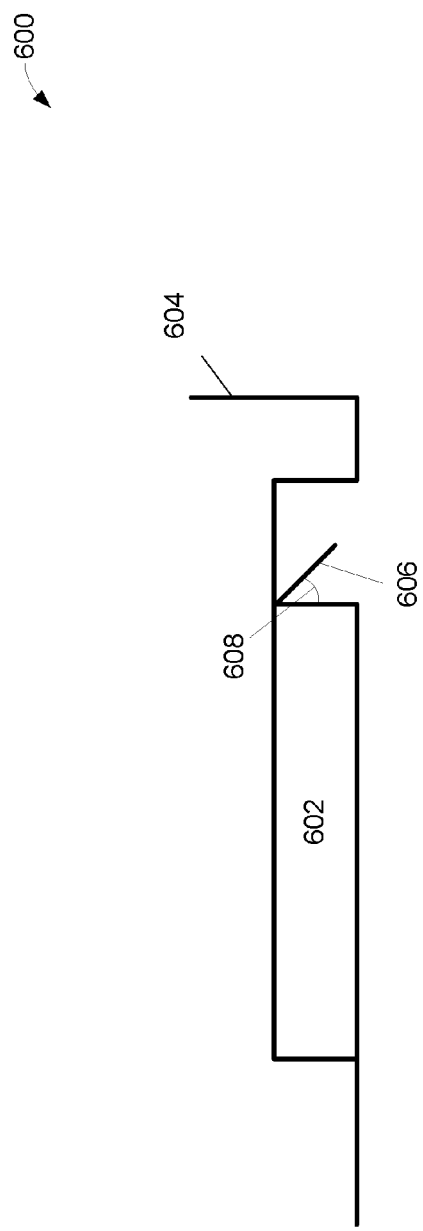
FIG. 6 illustrates one embodiment of the invention showing a side view where the ballast tank is located forward of the transom.

FIG. 6 illustrates, generally at 600, one embodiment of the invention showing a side view where the ballast tank 602 is located forward of the transom 604 and the gate 606 is used to open/close with an opening on the rear of the ballast tank 602.

In one embodiment of the invention, without a deployable scupper, the gate may be opened 10 degrees with respect to a normal to the waterline for rapid filling. For example in FIG. 6 assume the bottom of the ballast tank 602 is parallel to the waterline, then 608 is 10 degrees.

Figure 7:
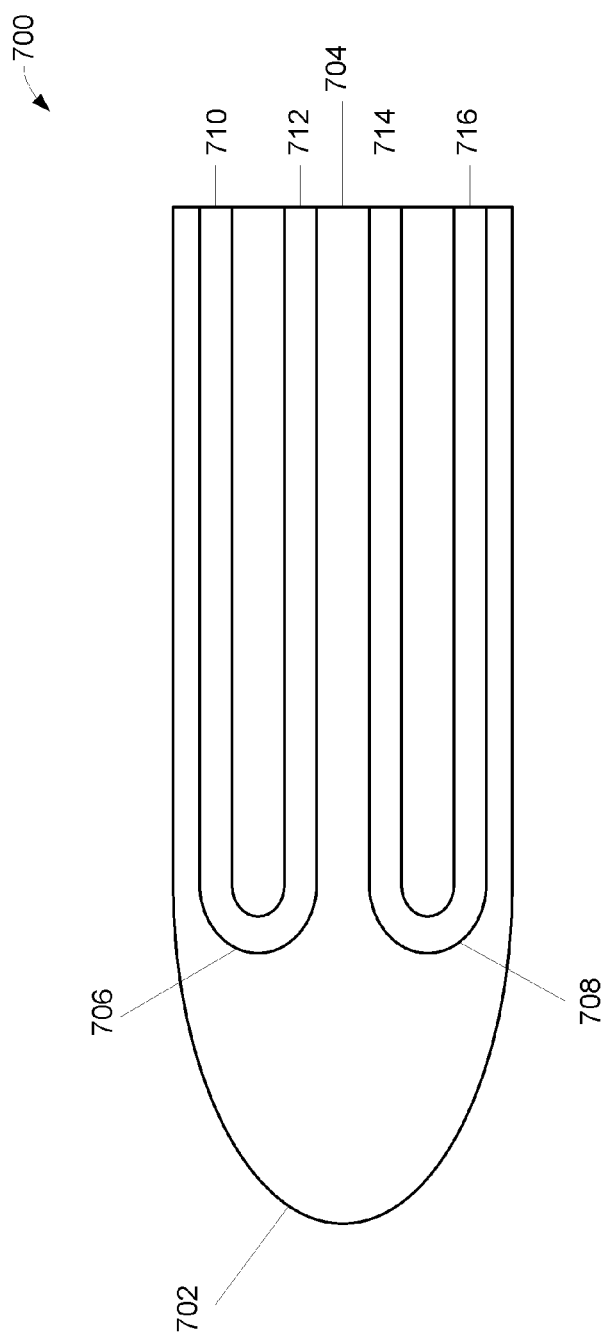
FIG. 7 illustrates one embodiment of the invention showing a top view of a boat having a transom and two U-shaped ballast tanks.

FIG. 7 illustrates, generally at 700, one embodiment of the invention showing a top view of a boat 702 having a transom 704 and two U-shaped ballast tanks 706 and 708. In this embodiment the transom 704 has a plurality of openings 710, 712, 714, and 716. Openings 710, 712, 714, and 716 may be used to fill/empty the respective ballast tanks 706 and 708. Not shown on these openings are the gates that can open/close the openings 710, 712, 714, and 716. Various operations of the gates that open/close the openings 710, 712, 714, and 716 allow for filling and emptying. For example, the gates for 712 and 716 may be opened to fill the ballast tanks 706 and 708. Not shown in FIG. 7 are ballast tank air vents that allow the air in the ballast tanks to be replaced by water when filling and water to be replaced by air when the ballast tanks are emptying. If ballast tanks 706 and 708 are to be quickly filled/emptied gates for 710, 712, 714, and 716 may be opened for filling/emptying. Gates 710, 712, 714, and 716 may be operated independently to achieve different boat performance. For example, assume ballast tanks 706 and 708 are empty and it's desired to lower the port side. Gates for one or more of 714 and 716 may be opened while gates for 710 and 712 remain closed. One of skill in the art will appreciate that all manner of possible opening for filling and emptying the ballast tanks, and closing for retaining water in the ballast tanks are possible.

Figure 8:
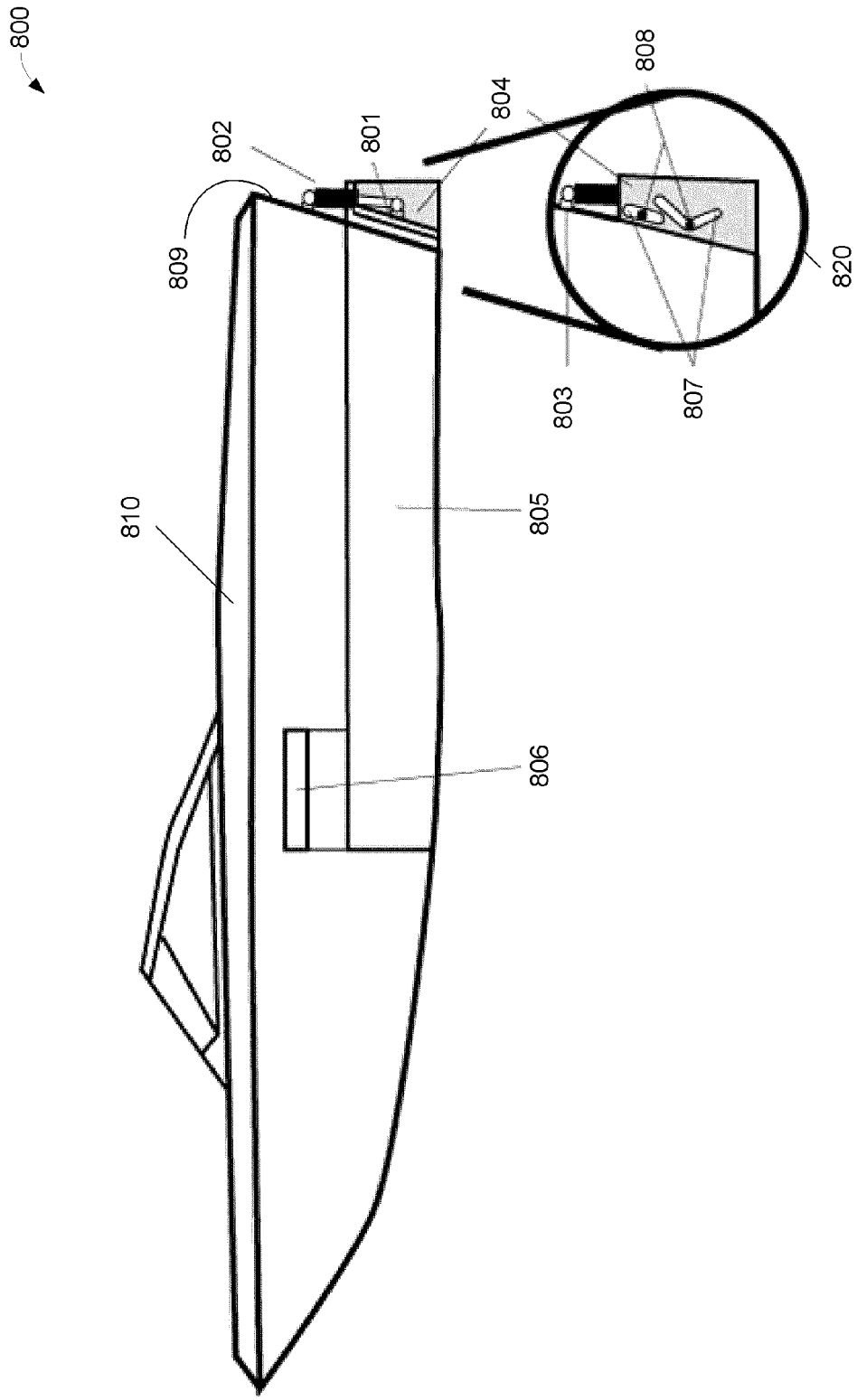
FIG. 8 illustrates one embodiment of the invention showing a side view of a boat with a three position pivoting track shown in the closed position.

FIG. 8 illustrates, generally at 800, one embodiment of the invention showing a side view of a boat 810 with a three position pivoting track shown in the closed position. At 809 is a transom. At 801 is a gate, at 802 is an actuator, at 803 a bracket, at 804 a side dam, at 805 a ballast tank, at 806 a vent, at 807 two gate positioning tracks, and at 808 two gate positioning bolts. At 820 is an expanded external view of the bracket 803, the side dam 804, the gate positioning tracks 807, and the gate positioning bolts 808. The expanded view 820 shows a three position pivoting track mechanism shown in the closed position.

FIG. 9 consists of FIG. 9A and FIG. 9B.

FIG. 9A illustrates, generally at 900, one embodiment of the invention showing a side view of a boat 910 where a three position pivoting track mechanism expanded external view 920 is shown in a flood position for filling ballast tank 905. At 901 is a gate, at 902 an actuator, at 903 a bracket, at 904 a side dam, at 905 a ballast tank, at 907 two gate positioning tracks, and at 908 two gate positioning bolts. At 920 is an expanded external view of the gate positioning track 907, and the gate positioning bolt 908. The expanded view 920 shows a three position pivoting track mechanism shown in the flood position. As illustrated in FIG. 9A the gate is in intimate contact with the ballast tank 905. If the ballast tank 905 is mounted against a transom such as 909 then the gate 901 is in intimate contact with the opening in the transom 909.

FIG. 9B illustrates, generally at 930, one embodiment of the invention showing a side view of a boat 940 where a three position pivoting track mechanism expanded external view 950 is shown in a drain position for draining ballast tank 935. At 931 is a gate, at 932 is an actuator, at 933 a bracket, at 934 a side dam, at 935 a ballast tank, at 937 two gate positioning tracks, and at 938 two gate positioning bolts. At 950 is an expanded external view of the gate positioning tracks 937, and the gate positioning bolts 938. The expanded view 950 shows a three position pivoting track mechanism shown in the drain position. As illustrated in FIG. 9B the gate is in intimate contact with the ballast tank 935. If the ballast tank 935 is mounted against a transom such as 939 then the gate 931 is in intimate contact with the opening in the transom 939.

The gate position track mechanism may have as many slots/tracks (gate positioning slots/tracks) and positions as needed to provide the needed gate movement. For example, as shown in FIG. 8 at 807 has two gate positioning tracks which have three positions. The closed position is shown in FIG. 8 with the gate positioning bolts 808 in the position as noted (substantially in the middle of each slot). The flood position is shown in FIG. 9A with the gate positioning bolts 908 in the position as noted (substantially at the bottom of each slot). The drain position is shown in FIG. 9B with the gate positioning bolts 938 in the position as noted (substantially at the top of each slot). What is to be appreciated is that in this embodiment of the gate positioning track there are three positions, however, the invention is not so limited, and for example, if a gate only needs to close and flood then only two positions are needed, see for example, FIG. 11A. If a gate only needs to close and drain then only two positions are needed, see for example, FIG. 11B. Thus depending upon what is required there may be multiple tracks/slots and multiple positions for a gate positioning mechanism.

FIG. 10 consists of FIG. 10A and FIG. 10B.

FIG. 10A illustrates, generally at 1000, one embodiment of the invention showing a side view of a double gate in the closed position. At 1001 is a gate, at 1002 is an actuator, at 1003 a bracket, at 1004 a side dam, and at 1005 a ballast tank.

FIG. 10B illustrates, generally at 1020, one embodiment of the invention showing a rear view of a ballast tank 1025 with double gate in the closed position. At 1021 is an intake gate, at 1028 is a drain gate, at 1022 is an actuator for the intake gate 1021, at 1029 is an actuator for the drain gate 1028, at 1027 is a gate positioning track, and at 1030 is a gate positioning track.

While FIG. 10 shows two gates, the invention is not so limited and in one embodiment either gate as shown in FIG. 10 may be an intake gate or an drain gate. Additionally in one embodiment there may be a single gate which opens/closes on one or more ballast tanks. For example in FIG. 7 there may be a single gate that opens/closes to openings 710, 712, 714, and 716 to allow for filling and emptying. Nor is the invention limited to two ballast tanks. There may be any number of ballast tanks. Additionally, there may be any number of gates, for example, 5, 6, 8, etc.

FIG. 11 consists of FIG. 11A and FIG. 11B.

FIG. 11A illustrates, generally at 1100, one embodiment of the invention showing a side view of a double gate with the intake gate open and the drain gate closed. At 1101 is an intake gate, at 1102 is an actuator for the intake gate 1101, at 1103 a bracket, at 1104 a side dam, and at 1105 a ballast tank. At expanded external view 1120 is a gate positioning track 1107 having two slots, and at 1108 are two a gate positioning bolts, one of each bolt in a slot (1107).

FIG. 11B illustrates, generally at 1130, one embodiment of the invention showing a side view of a double gate with the intake gate closed and the drain gate open. At 1131 is a drain gate, at 1132 is an actuator for the drain gate 1131, at 1133 a bracket, at 1134 a side dam, and at 1135 a ballast tank. At expanded external view 1150 is a gate positioning track 1137 having two slots, and at 1138 are two gate positioning bolts, one of each bolt in a slot (1137).

As noted in FIGS. 11A and 11B at 1120 and 1150 respectively, the gate positioning tracks have slots that may be different in order to effect the desired movement of the respective gates when moved by the respective actuator.

The gate positing bolt as shown in various embodiments is used to slide in the gate positioning track. As such any mechanism that will slide will work, for example, but not limited to a pin, a rotating sleeve, a bushing, a roller bearing, etc.

FIG. 12 consists of FIG. 12A and FIG. 12B.

FIG. 12A illustrates, generally at 1200, one embodiment of the invention showing a side view of a three position sliding track with the gate closed. At 1201 is a gate, at 1202 is an actuator, at 1203 a bracket, at 1204 a side dam, at 1205 a ballast tank, and at 1207 a gate positioning track.

FIG. 12B illustrates, generally at 1230, one embodiment of the invention showing a rear view of a three position sliding track with the gate closed. At 1231 is a gate, at 1232 is an actuator, at 1234 a side dam, at 1235 a ballast tank, and at 1237 a gate positioning track.

FIG. 13 consists of FIG. 13A and FIG. 13B.

FIG. 13A illustrates, generally at 1300, one embodiment of the invention showing a side view of a three position sliding track with the gate in the flood position. At 1301 is a gate, at 1302 is an actuator, at 1303 a bracket, at 1304 a side dam, at 1305 a ballast tank, and at 1307 a gate positioning track.

FIG. 13B illustrates, generally at 1330, one embodiment of the invention showing a side view of a three position sliding track with the gate in the drain position. At 1331 is a gate (hidden by 1337), at 1332 is an actuator, at 1333 a bracket, at 1334 a side dam, at 1335 a ballast tank, and at 1337 a gate positioning track.

FIG. 14 consists of FIG. 14A, FIG. 14B, and FIG. 14C.

FIG. 14A illustrates, generally at 1400, one embodiment of the invention showing a side view of a deployable scupper 1408 in a closed position with an external actuator 1402. At 1401 is a gate, at 1402 is an actuator, at 1403 a bracket, at 1404 a side dam, at 1405 a ballast tank, at 1408 a deployable scupper, and at 1409 a scupper deployment cable.

FIG. 14B illustrates, generally at 1430, one embodiment of the invention showing a rear view of a deployable scupper 1438 in a closed position with an external actuator 1432. At 1431 is a gate, at 1432 is an external actuator, at 1433 a bracket, at 1434 a side dam, at 1435 a ballast tank, and at 1438 a deployable scupper.

FIG. 14C illustrates, generally at 1460, one embodiment of the invention showing a side view of a deployable scupper 1468 in a closed position with an internal actuator 1462. At 1461 is a gate, at 1462 is an internal actuator, at 1463 a bracket, at 1464 a side dam, at 1465 a ballast tank, at 1468 a deployable scupper, and at 1469 a scupper deployment cable.

Figures 15, 15A, 15B:
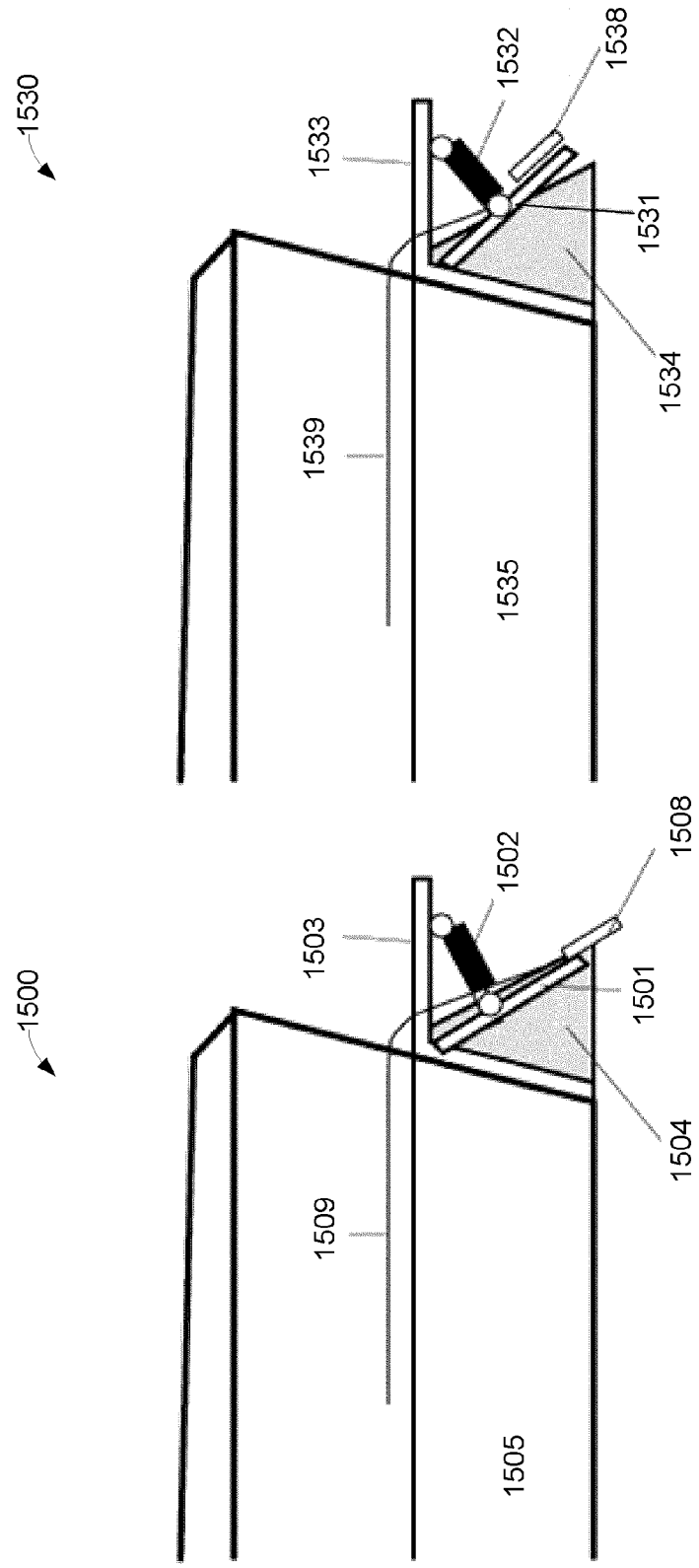
FIG. 15 consists of FIG. 15A, and FIG. 15B.
FIG. 15A illustrates one embodiment of the invention showing a side view of a deployable scupper in a flood position with an external actuator.
FIG. 15B illustrates one embodiment of the invention showing a side view of a deployable scupper in a drain position with an external actuator.

FIG. 15 consists of FIG. 15A, and FIG. 15B.

FIG. 15A illustrates, generally at 1500, one embodiment of the invention showing a side view of a deployable scupper 1508 in a flood position with an external actuator 1502. At 1501 is a gate, at 1502 is an external actuator, at 1503 a bracket, at 1504 a side dam, at 1505 a ballast tank, at 1508 a deployable scupper, and at 1509 a scupper deployment cable.

FIG. 15B illustrates, generally at 1530, one embodiment of the invention showing a side view of a deployable scupper 1538 in a drain position with an external actuator 1532. At 1531 is a gate, at 1532 is an external actuator, at 1533 a bracket, at 1534 a side dam, at 1535 a ballast tank, and at 1538 a deployable scupper, and at 1539 a scupper deployment cable.

While various embodiments of the invention have been shown with a scupper deployment cable, the invention is not so limited and any linkage may be used. For example, but not limited to a mechanical linkage assembly (e.g. like a bike chain), a series of connected rods, a solenoid, etc.

Various embodiments of the invention have shown a bracket, for example at 1533 in FIG. 15B. This bracket may be a separate assembly or integrated into, for example, a step for users to enter/exit the water from/into the boat.

While various embodiments of the present invention have shown, for example, a sliding/tilting gate for controlling water into/out of a ballast the invention is not so limited and other approaches are also possible as illustrated in some following figures and text.

FIG. 16 consists of FIG. 16A, and FIG. 16B.

FIG. 16A illustrates, generally at 1600, one embodiment of the invention showing a side view of a rotating cylinder 1609 in a closed position. At 1604 is a side dam, at 1605 a ballast tank, at 1607 is a deployable scupper, at 1608 a scupper deployment cable, at 1609 a cylinder, and at 1610 a cable motor. As may be seen the cylinder 1609 is in a closed position where water may not exit/enter the ballast tank 1605.

FIG. 16B illustrates, generally at 1630, one embodiment of the invention showing a rear view of a rotating cylinder (not shown) in a closed position. At 1634 is a side dam, at 1635 a ballast tank, and at 1637 is a deployable scupper.

FIG. 17 consists of FIG. 17A, and FIG. 17B.

FIG. 17A illustrates, generally at 1700, one embodiment of the invention showing a side view of a rotating cylinder 1709 in a flood position. At 1704 is a side dam, at 1705 a ballast tank, at 1707 is a deployable scupper, at 1708 a scupper deployment cable, at 1709 a cylinder, and at 1710 a cable motor. As may be seen the cylinder 1709 is in a flood position where water may enter the ballast tank 1705.

FIG. 17B illustrates, generally at 1730, one embodiment of the invention showing a side view of a rotating cylinder 1739 in a drain position. At 1734 is a side dam, at 1735 a ballast tank, at 1737 is a deployable scupper, at 1738 a scupper deployment cable, at 1739 a cylinder, and at 1740 a cable motor. As may be seen the cylinder 1739 is in a drain position where water may exit the ballast tank 1735.

Figure 18:
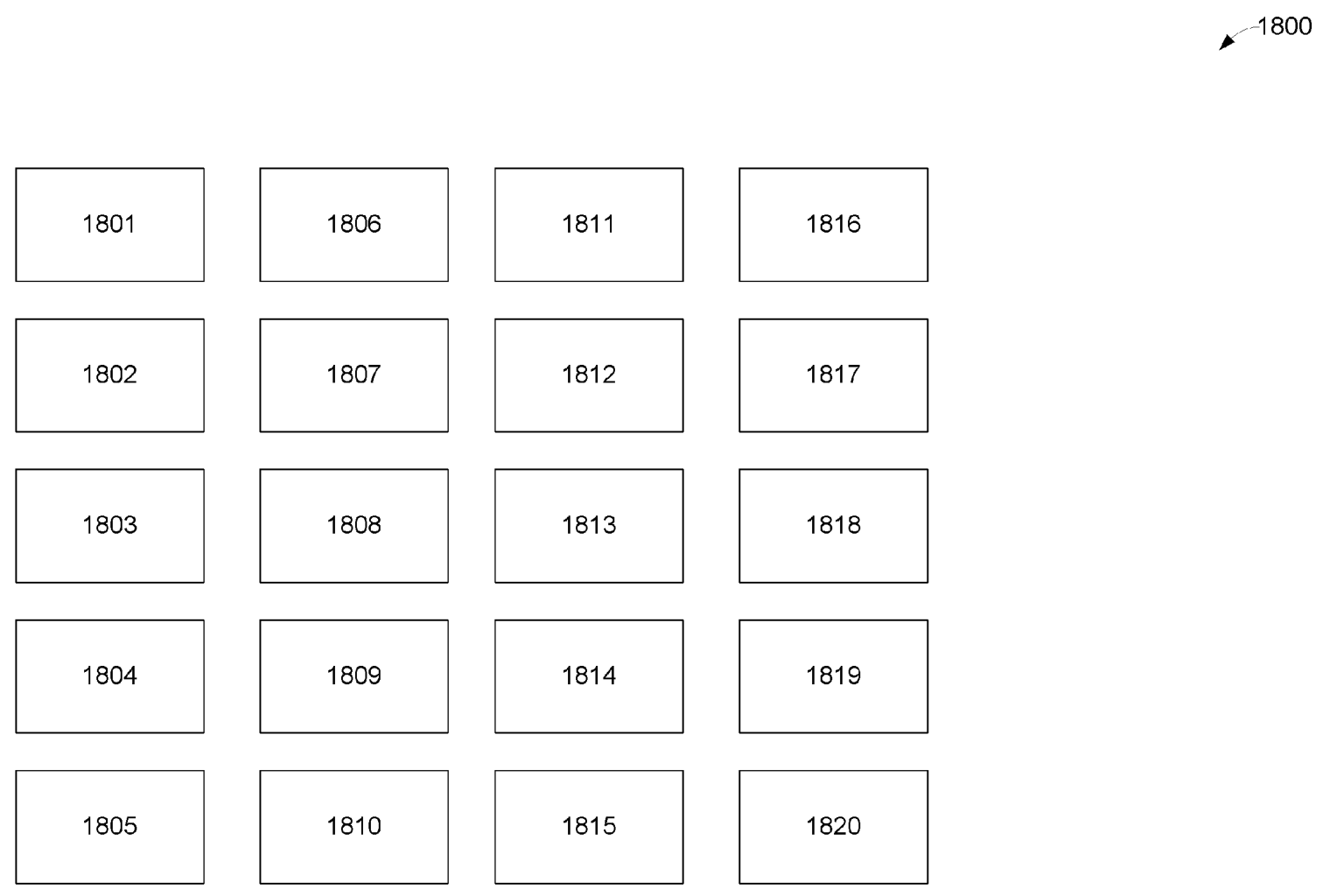

FIG. 18 shows, generally at 1800, various embodiments of the invention. At 1. A wake enlargement system for improving a wake generated by a boat, the system comprising: said boat having one or more ballast tanks; a rotatable cylinder, said rotatable cylinder having a closed position, a flood position, and a drain position; and wherein said rotatable cylinder when in said closed position closes said one or more ballast tanks such that water may not exit/enter said one or more ballast tanks.

At 2. The system of claim 1 wherein one or more of said one or more ballast tanks are vented ballast tanks.

At 3. The system of claim 2 further comprising wherein when said rotatable cylinder is in said flood position and when said boat is in forward motion in water some of said water enters said one or more ballast tanks.

At 4. The system of claim 3 further comprising wherein when said rotatable cylinder is first in said flood position and second later said rotatable cylinder is in said closed position then said entered water is retained in said one or more ballast tanks.

At 5. The system of claim 2 further comprising wherein when said rotatable cylinder is in said drain position and when said boat is in forward motion in water any said water in said one or more ballast tanks exits said one or more ballast tanks.

At 6. The system of claim 1 further comprising a plurality of rotatable cylinders.

At 7. The system of claim 1 further comprising a deployable scupper proximately mounted to said rotatable cylinder.

At 8. The system of claim 1 wherein one or more of said one or more ballast tanks is in intimate fluid contact with a transom on said boat and wherein said transom has a transom opening that coincides at least in part with an opening in said one or more ballast tanks and wherein said rotatable cylinder when in said closed position closes said transom opening.

At 9. A wake enlargement system for improving a wake generated by a boat, the system comprising: said boat having one or more ballast tanks; one or more rotatable cylinders, said one or more rotatable cylinders all having a closed position wherein when in said closed position cover an opening in said one or more ballast tanks; and wherein one or more of said one or more rotatable cylinders also have one or more positions selected from the group consisting of a flood position, and a drain position.

At 10. The system of claim 9 wherein each of said one or more rotatable cylinders has proximately located one or more water dams.

At 11. The system of claim 10 wherein each of said one or more rotatable cylinders is operated by one or more actuators, said actuators capable of rotating one or more of said one or more rotatable cylinders into said one or more positions.

At 12. The system of claim 11 wherein said one or more rotatable cylinders can each be independently rotated into said one or more positions.

At 13. The system of claim 9 wherein said one or more ballast tanks are substantially located between stringers in said boat.

At 14. The system of claim 9 wherein when said one or more rotatable cylinders are not in said closed position said boat regardless of motion in water will not flood water beyond said one or more ballast tanks.

At 15. A method for improving a wake generated by a boat, the method comprising:
providing one or more ballast tanks in said boat wherein an end of said one or more ballast tanks is in direct waterproof contact with an opening in a transom on said boat; mounting one or more rotatable cylinders to said transom such that when said one or more rotatable cylinders are in a closed position they cover said opening in said transom; and providing an actuator for each of said one or more rotatable cylinders, said actuator for rotating said one or more rotatable cylinders into a plurality of rotated positions.

At 16. The method of claim 15 further comprising: rotating said one or more rotatable cylinders into a closed position such that said one or more rotatable cylinders cover said opening in said transom such that fluid may not enter or exit said one or more ballast tanks.

At 17. The method of claim 15 further comprising: rotating said one or more rotatable cylinders into a flood position such that a portion of a scupper mounted proximate to said one or more rotatable cylinders extends below a bottom line of said boat such that fluid may enter said one or more ballast tanks.

At 18. The method of claim 15 further comprising: rotating said one or more rotatable cylinders into a drain position such that a lowermost edge of a scupper mounted proximate to said one or more rotatable cylinder does not extend below a bottom line of said boat such that fluid may exit said one or more ballast tanks.

At 19. The method of claim 15 further comprising: providing one or more side dams located proximate to said one or more rotatable cylinders At 20. The method of claim 17 further comprising: providing a cable assembly operatively coupled to said scupper.

What is to be appreciated by one skilled in the art is that by using the techniques disclosed it is possible in one embodiment, without anything more than a single gate and a vented ballast to quickly fill and empty the ballast of water.

Various embodiments of the present invention have discussed a three position sliding track where the three gate positions are closed, flooding, and draining. However the invention is not so limited and more multiple positions on sliding tracks may be used, for example, to control how fast or slow the flooding and draining occur.

Various embodiments of the present invention have discussed a position sliding track where the number of slots has been indicated at two. However the invention is not so limited and one or more slots may be used to effect gate control. For example, a single curved slot may control the closing and opening of a gate as well as lowering/raising a gate's position.

Thus a Method and Apparatus for Insta Fill Wake System have been described.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

As used in this description, "bottom line", "bottomline", or similar phrases means either a bottom of a boat or a straight line running along the bottom of a boat and extending past the edges of a boat. For example, a bottom line of a boat runs along the actual boat bottom and then extends, for example, past the transom. It is used to indicate features in relation to a boat bottom. For a curved hull each part of the curved hull, for example, as viewed from a rear-view would be extended by the bottom lines forming an imaginary curved hull extending past the transom. For example, in FIG. 8 it may be seen that the bottom of water dam 804 is extending along the bottom line of boat 810.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as ""substantially equal" is used to indicate that they are for all practical purposes equal.

It is to be understood that in any one or more embodiments of the invention where alternative approaches or techniques are discussed that any and all such combinations as might be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a Method and Apparatus for Insta Fill Wake System have been described.

What is claimed is:

1. A wake enlargement system for improving a wake generated by a boat, the system comprising:
    said boat having one or more ballast tanks;
    a rotatable cylinder, said rotatable cylinder having a closed position, a flood position, and a drain position; and
    wherein said rotatable cylinder when in said closed position closes said one or more ballast tanks such that water may not exit/enter said one or more ballast tanks.

2. The system of claim 1 wherein one or more of said one or more ballast tanks are vented ballast tanks.

3. The system of claim 2 further comprising wherein when said rotatable cylinder is in said flood position and when said boat is in forward motion in water some of said water enters said one or more ballast tanks.

4. The system of claim 3 further comprising wherein when said rotatable cylinder is first in said flood position and second later said rotatable cylinder is in said closed position then said entered water is retained in said one or more ballast tanks.

5. The system of claim 2 further comprising wherein when said rotatable cylinder is in said drain position and when said boat is in forward motion in water any said water in said one or more ballast tanks exits said one or more ballast tanks.

6. The system of claim 1 further comprising a plurality of rotatable cylinders.

7. The system of claim 1 further comprising a deployable scupper proximately mounted to said rotatable cylinder.

8. The system of claim 1 wherein one or more of said one or more ballast tanks is in intimate fluid contact with a transom on said boat and wherein said transom has a transom opening that coincides at least in part with an opening in said one or more ballast tanks and wherein said rotatable cylinder when in said closed position closes said transom opening.

9. A wake enlargement system for improving a wake generated by a boat, the system comprising:
    said boat having one or more ballast tanks;
    one or more rotatable cylinders, said one or more rotatable cylinders all having a closed position wherein when in said closed position cover an opening in said one or more ballast tanks; and
    wherein one or more of said one or more rotatable cylinders also have one or more positions selected from the group consisting of a flood position, and a drain position.

10. The system of claim 9 wherein each of said one or more rotatable cylinders has proximately located one or more water dams.

11. The system of claim 10 wherein each of said one or more rotatable cylinders is operated by one or more actuators, said actuators capable of rotating one or more of said one or more rotatable cylinders into said one or more positions.

12. The system of claim 11 wherein said one or more rotatable cylinders can each be independently rotated into said one or more positions.

13. The system of claim 9 wherein said one or more ballast tanks are substantially located between stringers in said boat.

14. The system of claim 9 wherein when said one or more rotatable cylinders are not in said closed position said boat regardless of motion in water will not flood water beyond said one or more ballast tanks.

15. A method for improving a wake generated by a boat, the method comprising:
    providing one or more ballast tanks in said boat wherein an end of said one or more ballast tanks is in direct waterproof contact with an opening in a transom on said boat;
    mounting one or more rotatable cylinders to said transom such that when said one or more rotatable cylinders are in a closed position they cover said opening in said transom; and
    providing an actuator for each of said one or more rotatable cylinders, said actuator for rotating said one or more rotatable cylinders into a plurality of rotated positions.

16. The method of claim 15 further comprising:
    rotating said one or more rotatable cylinders into a closed position such that said one or more rotatable cylinders cover said opening in said transom such that fluid may not enter or exit said one or more ballast tanks.

17. The method of claim 15 further comprising:
    rotating said one or more rotatable cylinders into a flood position such that a portion of a scupper mounted proximate to said one or more rotatable cylinders extends below a bottom line of said boat such that fluid may enter said one or more ballast tanks.

18. The method of claim 15 further comprising:
    rotating said one or more rotatable cylinders into a drain position such that a lowermost edge of a scupper mounted proximate to said one or more rotatable cylinder does not extend below a bottom line of said boat such that fluid may exit said one or more ballast tanks.

19. The method of claim 15 further comprising:
    providing one or more side dams located proximate to said one or more rotatable cylinders.

20. The method of claim 17 further comprising:
    providing a cable assembly operatively coupled to said scupper.

* * * * *